United States Patent [19]

Omata et al.

[11] 4,410,818

[45] Oct. 18, 1983

[54] SYNCHRONOUS MOTOR

[75] Inventors: Hiroshi Omata, Gotemba; Saichi Katumata, Susono, both of Japan

[73] Assignee: Mitsubishi Mallory Metallurgical Co., Ltd., Tokyo, Japan

[21] Appl. No.: 419,621

[22] Filed: Sep. 17, 1982

[30] Foreign Application Priority Data

Dec. 26, 1981 [JP] Japan ................................ 56-210598

[51] Int. Cl.³ .............................................. H02K 7/10
[52] U.S. Cl. ........................................ 310/41; 310/83; 301/164
[58] Field of Search ...................... 310/41, 83, 162–165

[56] References Cited

U.S. PATENT DOCUMENTS

| | | | |
|---|---|---|---|
| 3,614,492 | 10/1971 | Yatsushiro et al. | 310/41 |
| 3,824,415 | 7/1974 | Beusink | 310/41 |
| 3,842,296 | 10/1974 | Gerber | 310/41 |
| 3,860,841 | 1/1975 | Jullien-Dauin | 310/41 |
| 3,883,758 | 5/1975 | Lechner | 310/41 |
| 3,898,488 | 8/1975 | Erwin et al. | 310/41 X |
| 4,061,936 | 12/1977 | Woolley | 310/41 |

Primary Examiner—Donovan F. Duggan
Attorney, Agent, or Firm—Cushman, Darby & Cushman

[57] ABSTRACT

A synchronous motor includes a reduction gear train operatively connecting a rotor to an output shaft. A retaining member is rotatably mounted on and frictionally engages the first gear member of the reduction gear train for angular movement about the axis thereof, the first gear member being in mesh with a drive gear on the rotor. The retaining member has an abutment lug which is engageable with the engaging portion when the rotor is rotated in its reverse direction whereupon the engaging portion rebounds from the lug to cause the rotor to rotate in its normal direction. The shaft of the first gear member is parallel to the axis of rotation of the rotor and is disposed at a position angularly displaced about the axis of the rotor from a predetermined point of the rotor by an angle of 360°/P x n when said engaging portion is brought into engagement with the abutment lug wherein P is the number of the magnetic poles around said rotor and n is an integer (0, 1, 2, 3 . . . ).

2 Claims, 7 Drawing Figures

SYNCHRONOUS MOTOR

BACKGROUND OF THE INVENTION

1. Field of the Invention

This invention relates to a synchronous motor of the compact type and particularly to a reduction gear train incorporated therein.

2. Prior Art

One conventional synchronous motor 10 shown in FIGS. 1 and 2 comprises a first stator 11 of a cylindrical shape having a closed bottom, a second stator 12 of a circular shape having a peripheral flange 12a and snugly fitted in the first stator 11 against movement, a coil 13 wound around a bobbin 14 interposed between the second stator 12 and the bottom of the first stator 11, a rotor 15 in the form of a multi-pole permanent magnet mounted on a shaft 16 journalled in the bottom of the first stator 11 and a cover member 17 covering an open top of the first stator 11, and a reduction gear train 18 arranged between the cover member 17 and the second stator 12. The first stator 11 has stamped-out portions 11a directed toward the second stator 12 while the second stator 12 has stamped-out portions 12a directed toward the first stator 11. These stamped-out portions 11a and 12a serve as magnetic poles and are disposed in surrounding relation to the rotor 15. The rotor 15 has a plurality of poles of alternate north and south polarity and is rotated about the shaft 16 in synchronism with a rotating magentic field caused by the excited coil 13. The rotation of the rotor 15 is transmitted through the reduction gear train 18 to an output shaft 20.

The synchronous motor 10 has means for limiting the rotation of the rotor 15 in its reverse direction. More specifically, the rotor 15 has an elongated engaging portion 21 formed integrally on its upper surface, the engaging portion 21 extending diametrically of the rotor 15, as shown in FIG. 2. A retaining plate is rotatably mounted on a boss of a first gear member 22 of the reduction gear train 18, the retaining plate having an abutment lug 23a formed at one end thereof and directed toward the rotor 15. The retaining plate is disposed below a gear portion 22a of the first gear member 22 and is held in frictional engagement therewith so that the retaining plate is rotatable with the gear member 22. When the rotor 15 is rotated in its reverse direction at the initiation of the operation of the synchronous motor 10, the abutment lug 23a intrudes into a circle generated by the opposite end faces of the engaging portion 21 so that one of the opposite ends of the engaging portion 21 is brought into striking engagement with the abutment lug 23a. Upon striking of the one end of the engaging portion 21 against the abutment lug 23a, the engaging portion 21 rebounds from the lug 23a so that the rotor 15 is caused to rotate in its normal direction. When the rotor 15 is rotated in its normal direction, the lug 23a is moved out of the circle generated by the opposite end faces of the engaging portion 21 and is brought into contact with a stop member (not shown). Thus, the lug 23a is held against movement and will not interfere with the rotation of the rotor 15 in its normal direction. When the engaging portion 21 of the rotor 15 is brought into engagement with the abutment lug 23a of the retaining plate as a result of the rotation of the rotor 15 in its reverse direction, it is necessary that the north and south poles N and S of the rotor 15 should be located in predetermined angular positions relative to the magnetic poles 11a and 12a of the first and second stators 11 and 12 so as to properly effect the rotation of the rotor 15 in its normal direction. For example, in FIG. 2, when the engaging portion 21 of the rotor 15 is brought into contact with the abutment lug 23a of the retaining plate, the magnetic pole Sa is angularly displaced about the axis of the rotor 15 from a predetermined point of the magnetic pole 11a adjacent to the magnetic pole Sa by an angle $\alpha(11.25°)$.

In the construction of the synchronous motor of this compact type, the positions of the rotor 15 and output shaft 20 are first determined, and then the gear members of the reduction train 18 are arranged sequentially in a direction from the output shaft 20 toward the rotor 15. With this arrangement, the position of the first gear member 22, which meshingly engages the rotor 15, must be varied when it is desired to change the number of revolutions of the output shaft 20. As a result, the position of contact of the engaging portion 21 with the abutment lug 23a is changed, and therefore the angular positions of the magnetic poles S and N of the rotor 15 relative to the magnetic poles 11a and 12a are also changed. In such a case, there are often occasions when the rotor 15 is not caused to rotate in its normal direction upon engagement of the engaging portion 21 with the abutment lug 23a. Therefore, conventionally, in order that the first gear member is always located in a predetermined position relative to the rotor 15 regardless of the number of revolutions of the output shaft 20, the positions of the magnetic poles N and S around the periphery of the rotor 15 are changed depending on the number of revolutions of the output shaft 20. However, with this method, various kinds of rotors having different magnetic-pole arrangements must be prepared depending on the number of revolutions of the output shaft 20. This increases the overall manufacturing cost of the synchronous motor since one common rotor can not be used. In addition, such rotors having different magnetic-pole arrangements can not be distinguished from one another from their appearance, and therefore a wrong rotor may be used in the manufacture of the synchronous motor, which will lead to a malfunction thereof.

SUMMARY OF THE INVENTION

It is therefore an object of this invention to provide a synchronous motor having an improved reduction gear train whereby one common rotor can be used regardless of the number of revolutions of an output shaft.

According to the present invention, there is provided a synchronous motor comprising a rotor having a plurality of permanent magnetic poles around its periphery and having a drive gear formed integrally with and coaxially with the rotor, the rotor having an engaging portion; a reduction gear train operatively connecting the rotor to an output shaft, the reduction gear train comprising a plurality of gear members having respective shafts about which they are rotated, the shafts being parallel to the axis of rotation of the rotor and disposed therearound in spaced relation to each other; a stator having a plurality of electromagnetic poles disposed around the rotor; and a retaining member rotatably mounted on the first gear member and frictionally engaging the first gear member for angular movement about the axis thereof, the retaining member having an abutment lug which is engageable with the engaging portion when the rotor is rotated in one direction whereupon the engaging portion rebounds from the lug to cause the rotor to rotate in the opposite direction, the improvement wherein the shaft of the first gear member is disposed at a position angularly displaced about the axis of the rotor from a predetermined point of the rotor by an angle of 360°/P×n when the engaging portion is brought into engagement with the abutment lug wherein P is the number of the magnetic poles around the rotor and n is an integer (0, 1, 2, 3, . . . ).

DESCRIPTION OF THE PREFERRED EMBODIMENTS

Figure 1:
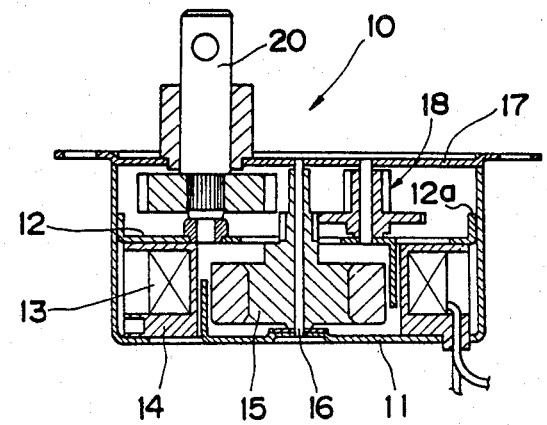
FIG. 1 is a cross-sectional view of a conventional synchronous motor.

One embodiment of the present invention will be described with reference to FIGS. 3 to 6. Like reference numerals denote corresponding parts in several views. A synchronous motor 25 according to this invention is similar in construction to the synchronous motor 10 of FIGS. 1 and 2 but has an improved reduction gear train. The synchronous motor 25 comprises a reduction gear train 18 composed of five gear members 22, 26 to 28 and a gear 29 mounted on an output shaft 20. The gear members 22 and 26 to 28 have gear portions 22a and 26a to 28a and pinion portions 22b and 26b to 28b, respectively. Shafts 22c and 26c to 28c of the gear members 22 and 26 to 28 are journalled in a cover member 17 and a second stator 12, respectively. Thus, these gear members are disposed between the cover member 17 and the second stator 12 for rotation about their respective shafts. One end of the output shaft 20 is borne in a bearing member 30 mounted on the second stator 12, and the output shaft 20 rotatably extends through the cover member 17.

A rotor 15 has an integral drive gear or pinion portion 15a formed on an elongated engaging portion 21. The pinion portion 15a is disposed in coaxial relation to the rotor 15 and is in mesh with the gear portion 22a of the first gear member 22. The pinion portion 22b of the first gear member 22 is in mesh with the gear portion 26a of the second gear member 26. The pinion portion 26b of the second gear member 26 is in mesh with the gear portion 27a of the third gear member 27. The pinion 27b is in mesh with the gear portion 28a of the fourth gear member 28. The pinion portion 28b of the fourth gear member 28 is in mesh with the fifth gear 29 on the output shaft 20. Thus, the rotation of the rotor 15 is transmitted to the output shaft 20 through the reduction gear train 18.

Figure 2:
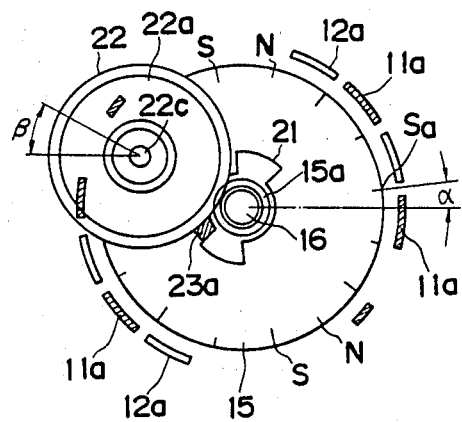
FIG. 2 is a schematic cross-sectional view of the synchronous motor.
Figure 3:
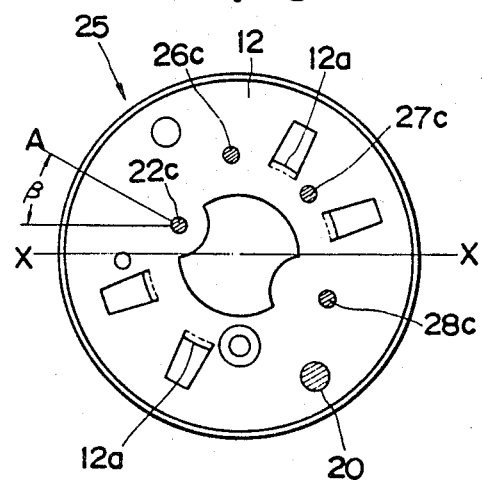
FIG. 3 is a schematic cross-sectional view of a synchronous motor according to the present invention.
Figure 4:
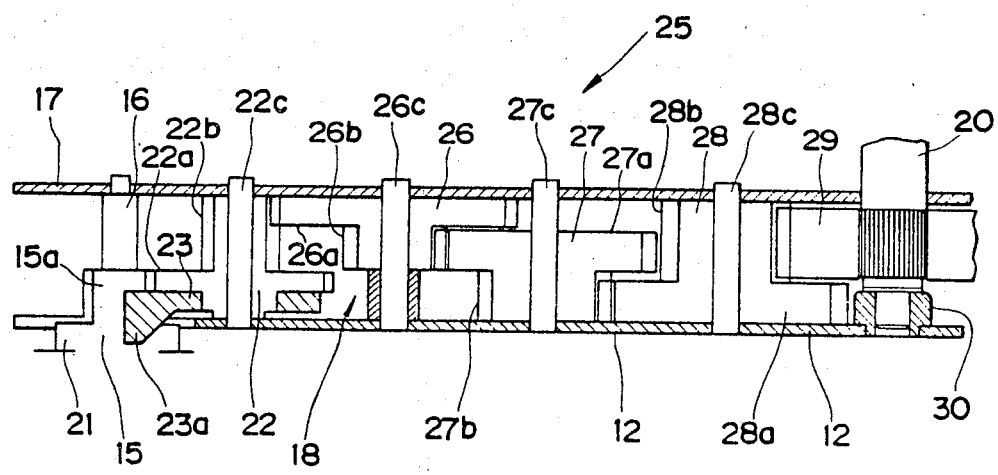
FIG. 4 is a fragmentary cross-sectional view showing a reduction gear train of the motor of FIG. 3.

The shaft 16 of the rotor 15 is disposed at the center of the circular second stator 12. As shown in FIG. 3, the output shaft 20 is disposed in eccentric relation to the center of the second stator 12. The shafts 22c, 26c, 27c and 28c of the first to fourth gear members 22, 26, 27 and 28 are spaced in a clockwise direction around the axis of the rotor 15. Also, the shaft 22c of the first gear member 22 is disposed at a position angularly displaced clockwise about the axis of the rotor 15 from a reference line X—X by an angle of $\beta$ (FIG. 3). The angle $\beta$ is so determined that when the rotor 15 is rotated in its reverse direction to bring the engaging portion 21 into engagement with an abutment lug 23a of a retaining plate 23, the magnetic pole Sa of the rotor 15 is angularly spaced from the predetermined point of the magnetic pole 11a by an angle $\alpha(11.25°)$ (FIG. 2). The retaining plate 23 is rotatably mounted on a boss 22d of the first gear member 22 in coaxial relation to the pinion portion 22b in a direction away therefrom.

The reason that one common rotor 15, having a predetermined magnetic-pole arrangement around its periphery, can be used regardless of the number of revolutions of the output shaft 20 will now be described.

When the number of the magnetic poles of the rotor 15 is sixteen and when a voltage applied to the synchronous motor 25 has a frequency of 60 Hz, the number N of revolutions of the rotor 15 is obtained from the following formula:

$$N = \frac{120f}{P} = \frac{120 \times 60}{16} = 450 \text{ (rpm)}$$

Then, when the number of revolutions of the output shaft 20 is 4 rpm, the reduction ratio $R_1$ is 1/112.5. In this case, the pinion 15a has 15 teeth, the gear portion 22a has 45 teeth, the pinion portion 22b has 12 teeth, the gear portion 26a has 45 teeth, the pinion portion 26b has 16 teeth, the gear portion 27a has 40 teeth, the pinion portion 27b has 16 teeth, the gear portion 28a has 32 teeth, the pinion portion 28b has 14 teeth, and the gear 29 has 28 teeth. The reduction ratio $R_1$ is obtained from the following formula:

$$R_1 = \frac{15}{45} \times \frac{12}{45} \times \frac{16}{40} \times \frac{16}{32} \times \frac{14}{28} = \frac{1}{112.5}$$

When the number of revolutions of the output shaft 20 is 5 rpm, the reduction ratio $R_2$ is 1/90. In this case, the pinion 15a has 15 teeth, the gear portion 22a has 45 teeth, the pinion portion 22b has 14 teeth, the gear portion 26a has 42 teeth, the pinion portion 26b has 16 teeth, the gear portion 27a has 40 teeth, the pinion portion 27b has 16 teeth, the gear portion 28a has 32 teeth, the pinion portion 28b has 14 teeth, and the gear 29 has 28 teeth. The reduction ratio $R_2$ is obtained from the following formula:

$$R_2 = \frac{15}{45} \times \frac{14}{42} \times \frac{16}{40} \times \frac{16}{32} \times \frac{14}{28} = \frac{1}{90}$$

When the number of revolutions of the output shaft 20 is 6 rpm, the reduction ratio $R_3$ is 1/75. In this case, the pinion 15a has 15 teeth, the gear portion 22a has 45 teeth, the pinion portion 22b has 14 teeth, the gear portion 26a has 42 teeth, the pinion portion 26b has 16 teeth, the gear portion 27a has 40 teeth, the pinion portion 27b has 18 teeth, the gear portion 28a has 30 teeth, the pinion portion 28b has 14 teeth, and the gear 29 has 28 teeth. The reduction ratio $R_3$ is obtained from the following formula:

$$R_3 = \frac{15}{45} \times \frac{14}{42} \times \frac{16}{40} \times \frac{18}{30} \times \frac{14}{28} = \frac{1}{75}$$

In the above three cases, the rotor pinion 15a has 15 teeth, and the gear portion 22a of the first gear member 22 in mesh with the rotor pinion 15a has 45 teeth. Thus, the sum of these teeth is 60. Also, the pinion portion 26b of the second gear member 26 has 16 teeth, and the gear portion 27a of the third gear member 27 in mesh with the pinion portion 26b has 40 teeth. Thus, the sum of these teeth is 56. Also, in the above two cases, the pinion portion 27b of the third gear member 27 has 16 teeth, and the gear portion 28a of the fourth gear member 28 in mesh with the pinion portion 27b has 32 teeth. In the other case, the pinion portion 27b has 18 teeth, and the gear portion 28a has 30 teeth. Thus, in the above three cases, the sum of the teeth of the pinion portion 27b and the teeth of the gear portion 28a is 48. Also, the pinion portion 28b has 14 teeth, and the gear 29 on the output shaft 20 in mesh with the pinion portion 28b is 28. Thus, the same of these teeth is 42.

Further, in the two cases, the pinion portion 22b of the first gear member 22 has 14 teeth, and the gear portion 26a of the second gear member 26 in mesh with the pinion portion 22b has 42 teeth. Thus, the sum of these teeth is 56. In the other case, the pinion portion 22b has 12 teeth, and the gear portion 26a has 45 teeth. Thus, the sum of these teeth is 57 and approximates the above sum of 56. Thus, the sum of the teeth of each meshed pinion and gear is equal or substantially equal in the above three cases. With this arrangement, the shafts of each meshed pinion and gear are disposed at the same interval in the above three cases. Therefore, even when one common rotor 15 is used, the shaft 22c of the first gear member 22 can be located at the above-mentioned predetermined position indicated by the angle $\beta$ (FIG. 3) regardless of the number of revolutions of the output shaft 20.

In the above embodiments, the reduction gear train 18 has five gear members. Generally, a reduction gear train for a synchronous motor of this compact type has 2 to 7 gear members. Therefore, modified reduction gear trains having four, three and two gear members, respectively, will now be described.

Figure 5:
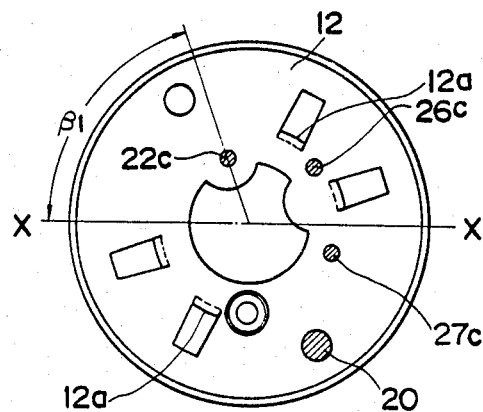
FIGS. 5 to 7 are views similar to FIG. 3 but showing modified reduction gear trains, respectively.

A reduction gear train shown in FIG. 5 has four gear members 22, 26, 27 and 29. The shaft 22c of the first gear member 22 is angularly displaced clockwise from the reference line X—X by an angle $$\beta_1 \left( = \beta + 2 \times \frac{360°}{16} \right).$$

The shafts 26a and 27a of the second and the third gear members 26 and 27 are angularly spaced about the axis of the rotor 15.

Figure 6:
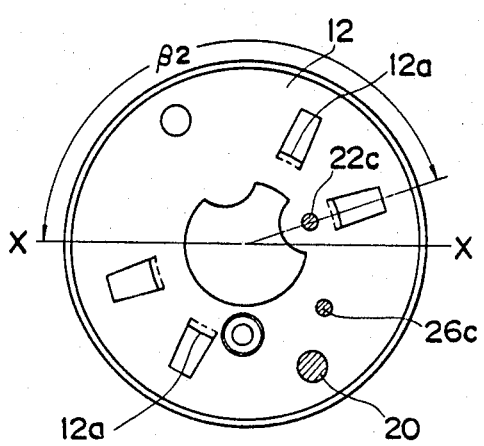

A reduction gear train shown in FIG. 6 has three gear members 22, 26 and 29. The shaft 22c of the first gear member 22 is angularly displaced clockwise from the reference line X—X by an angle $$\beta_2 \left( = \beta + 6 \times \frac{360°}{16} \right).$$

The shaft 26c of the second gear member 26 is angularly spaced clockwise from the shaft 22c about the axis of the rotor 15.

Figure 7:
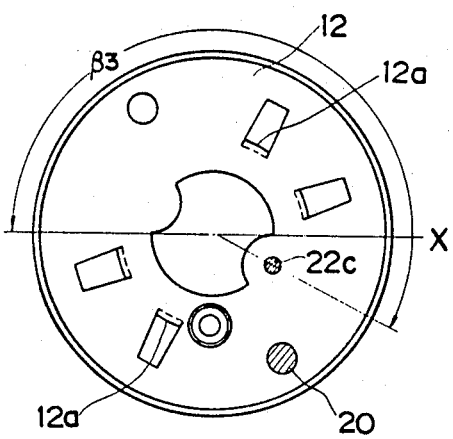

A reduction gear train shown in FIG. 7 has two gear members 22 and 29. The shaft 22c of the first gear member 22 is angularly displaced clockwise from the reference line X—X by an angle $$\beta_3 \left( = \beta + 8 \times \frac{360°}{16} \right).$$

As is clear from the above, where the number of the magnetic poles N and S around the periphery of the rotor 15 is P, the shaft 22c of the first gear member 22 is angularly displaced about the axis of the rotor 15 by an angle $$\beta \pm n \times \frac{360°}{P} \quad (n = 0, 1, 2, 3 \ldots)$$

from a predetermined point of the rotor 15 when the engaging portion 21 is disposed in contact with the abutment lug 23a. This predetermined point of the rotor 15 lies on a line A defining the angle $\beta$ in FIG. 3. With this arrangement, when the rotor 15 is rotated in its reverse direction to bring the engaging portion 21 into engagement with the abutment lug 23a, the rotor 15 is always disposed at a predetermined angular position relative to the magnetic poles 11a and 12a of the first and second stators 11 and 12. Thus, in this condition, the magnetic pole $S_a$ of the rotor 15 is angularly spaced from the magnetic pole 11a by the predetermined angle $\alpha$ (FIG. 2) so that the rotor 15 is caused to be smoothly rotated in its normal direction. Thus, regardless of the number of revolutions of the output shaft 20, one common rotor can be used to achieve the proper operation of the synchronous motor.

What is claimed is:

1. In a synchronous motor comprising a rotor having a plurality of permanent magnetic poles around its periphery and having a drive gear formed integrally with and coaxially with said rotor, said rotor having an engaging portion; a reduction gear train operatively connecting said rotor to an output shaft, said reduction gear train comprising a plurality of gear members having respective shafts about which they are rotated, said shafts being parallel to the axis of rotation of said rotor and disposed therearound in spaced relation to each other, a first gear member of said reduction gear train being in mesh with said drive gear; a stator having a plurality of electromagnetic poles disposed around said rotor; and a retaining member rotatably mounted on said first gear member and frictionally engaging said first gear member for angular movement about the axis thereof, said retaining member having an abutment lug which is engageable with said engaging portion when said rotor is rotated in one direction whereupon said engaging portion rebounds from said lug to cause said rotor to rotate in the opposite direction; the improvement wherein the shaft of said first gear member is disposed at a position angularly displaced about the axis of said rotor from a predetermined point of said rotor by an angle of 360°/P×n when said engaging portion is brought into engagement with said abutment lug wherein P is the number of the magnetic poles around said rotor and n is an integer (0, 1, 2, 3 . . . ).

2. A method of arranging a reduction gear train for a synchronous motor, said synchronous motor comprising a rotor having a plurality of permanent magnetic poles around its periphery and having a drive gear formed integrally with and coaxially with said rotor, said rotor having an engaging portion; said reduction gear train operatively connecting said rotor to an output shaft, said reduction gear train comprising a plurality of gear members having respective shafts about which they are rotated, said shafts being parallel to the axis of rotation of said rotor and disposed therearound in spaced relation to each other, a first gear member of said reduction gear train being in mesh with said drive gear; said synchronous motor also comprising a stator having a plurality of electromagnetic poles disposed around said rotor; and a retaining member rotatably mounted on said first gear member and frictionally engaging said first gear member for angular movement about the axis thereof, said retaining member having an abutment lug which is engageable with said engaging portion when said rotor is rotated in one direction whereupon said engaging portion rebounds from said lug to cause said rotor to rotate in the opposite direction; said method comprising the step of locating the shaft of said first gear member at a position angularly displaced about the axis of said rotor from a predetermined point of said rotor by an angle of $360°/P \times n$ when said engaging portion is brought into engagement with said abutment lug wherein P is the number of the magnetic poles around said rotor and n is an integer (1, 2, 3 ...).

* * * * *

# UNITED STATES PATENT AND TRADEMARK OFFICE
CERTIFICATE OF CORRECTION

PATENT NO. : 4,410,818

DATED : October 18, 1983

INVENTOR(S) : Hiroshi OMATA & Saichi KATUMATA

It is certified that error appears in the above-identified patent and that said Letters Patent is hereby corrected as shown below:

On the Title Page
    [73] Change "Mitsubishi Mallory Metallurgical Co., Ltd." to

--KABUSHIKI KAISHA HIGASHIFUJI SEISAKUSHO--

Signed and Sealed this

Twenty-fourth Day of July 1984

[SEAL]

Attest:

GERALD J. MOSSINGHOFF

Attesting Officer      Commissioner of Patents and Trademarks